United States Patent [19]

Holzner et al.

[11] Patent Number: 4,880,649

[45] Date of Patent: Nov. 14, 1989

[54] PROCESS FOR FLAVOURING AN EDIBLE COMPOSITION

[75] Inventors: Günter Holzner, Grand-Lancy; Peter Kittner, Thonex; Anthony Blake, Grand-Lancy, all of Switzerland

[73] Assignee: Firmenich S.A., Geneva, Switzerland

[21] Appl. No.: 167,749

[22] Filed: Mar. 15, 1988

[30] Foreign Application Priority Data

Mar. 26, 1987 [CH] Switzerland .................... 1153/87

[51] Int. Cl.⁴ ................................................ A23F 3/40
[52] U.S. Cl. .................................... 426/302; 426/597; 426/89; 426/96; 426/102; 426/103
[58] Field of Search .................. 426/597, 89, 96, 102, 426/103, 302

[56] References Cited

U.S. PATENT DOCUMENTS 4,515,769  5/1985  Merritt et al. .................... 426/98 X
4,534,983  8/1985  Koene et al. .................... 426/597 X

FOREIGN PATENT DOCUMENTS 0110700  6/1984  European Pat. Off. ............ 426/302
3318650  11/1984  Fed. Rep. of Germany ...... 426/597
2074838  11/1981  United Kingdom ................ 426/597

*Primary Examiner*—Joseph Golian
*Attorney, Agent, or Firm*—Pennie & Edmonds

[57] ABSTRACT

Compositions or spices in the form of leaves, powders or particles are flavored with an emulsion containing an active volatile flavoring substance by directly spraying the exposed surface with the emulsion comprising the flavoring substance mixed with a solid film-building vehicle and an emulsifying agent.

A flavoring process of this kind is particularly suitable for flavoring tea or products for preparing infusions or decoctions or spices, or for perfuming solid materials used for packaging.

4 Claims, No Drawings

PROCESS FOR FLAVOURING AN EDIBLE COMPOSITION

BRIEF SUMMARY OF THE INVENTION

The present invention relates to the art of flavors,- more precisely it provides an edible composition or spice in the form of leaves, powders or particles flavoured with an emulsion containing an active volatile flavouring substance non-miscible with water, characterised in that the flavouring substance is intimately mixed in contact with the leaves, powders or particles of the composition or spice or with the packaging containing them, by directly spraying their exposed surface with a flavouring emulsion comprising:
  (a) a solid film-building vehicle chosen from among polyvinyl acetate, polyvinyl alcohol, dextrins, natural or modified starch, natural or modified proteins, vegetable gums, pectins, xanthanes, carboxymethyl cellulose, methyl cellulose, hydroxyethyl cellulose and lipoheterosaccharides, and
  (b) an emulsifying agent chosen from among fatty-acid mono- or diglycerides, esters derived from a combination of fatty acids with sorbitol or a saccharide or alkoxylated derivatives thereof or an ester of tartaric, citric, ascorbic or lactic acid and
  (c) an active volatile flavouring substance non-miscible with water.

The invention relates further to a porous solid material for packaging of edible compositions or spices, which material is characterised in that it is treated by spraying or immersion in the flavouring emulsion defined above.

BACKGROUND OF THE INVENTION

During the last decade in particular, there has been a considerable increase in sales of flavoured tea. This is due partly to the attraction felt by the customer for non-traditional tea-based drinks such as soluble tea, iced tea, various liquid mixtures ready for consumption or carbonated drinks, which are on offer in various forms, in bottles, cans or cartons.

Most of these drinks are enriched with natural or synthetic flavours. Traditionally tea has been flavoured by adding certain essential oils, e.g. jasmine or rose essence, or spices such as cinnamon, cardamom or mint, or fruit flavours, e.g. strawberry, peach, banana or grape.

On the other hand, tea acquires its characteristic aroma during the various stages of maturing and packaging. Withering and curling of leaves, fermentation and drying are other operations which modify the original taste and flavour of tea and which, like the nature of the soil and climatic conditions of the place where the plant is cultivated, determine its aromatic characteristics.

Although systematic studies have not been made, experience has shown that prolonged storage of tea leaves after fermentation destroys the aroma, and hence there is a need for flavouring.

Usually flavouring is done simply by spraying the flavour in solution in an inert edible solvent on to the leaves, or by mixing the leaves with solid particles containing the flavouring, in which the case the technique of microencapsulation of the "fluidised bed" process is used. [See e.g. European patent application No. 70719 published on Jan. 26, 1983].

However, these methods have serious disadvantages. Firstly, the method of spraying a solution of flavouring is inefficient in that the dispersed flavouring tends to evaporate from the surface of the treated leaves in a relatively short time. On the other hand, the method using solid flavoured capsules is inconvenient in operation since it has been found that the particles tend to separate by gravity from the mass of leaves and accumulate at the bottom of the vessel in which they are stored or transported. In both cases, flavouring is non-uniform.

THE INVENTION

We have now discovered that tea or other edible compositions or spices in the form of leaves, powders or particles can be flavoured by a simple method which consists in placing an active volatile flavouring substance non-miscible with water in contact with the leaves, powders or particles of composition or spice, contact being obtained by directly spraying the exposed surface with an emulsion obtained by mixing the flavouring substance with an aqueous solution of a film-building water-soluble vehicle in the presence of an emulsifying agent.

The volatile flavouring substance is initially retained on the surface of the leaves, powders or particles of composition or spice by adhesion of the emulsion owing to the bonding effect of the vehicle substance. After subsequent drying, by simple gradual exposure of the treated composition or spice to air or by using a source of heat, applying slight suction or aeration if necessary, the flavouring substance is retained in the form of droplets coated with a protective water-soluble layer consisting of the film-building vehicle, which is now dry.

The method is simple and does not need special apparatus such as an atomiser or a fluidised-bed mixer. The operation is also carried out at ambient temperature, thus saving energy as compared with the previously-mentioned methods. In most cases it is not even necessary to dry the resulting product, since the water used for preparing the emulsion is almost completely absorbed by the leaves, powders or particles in order to keep them at the required moisture content.

The water-soluble film-building vehicle can be polyvinyl acetate (PVA), polyvinyl alcohol, dextrins (natural or modified), starch (natural or modified), vegetable gums, proteins (natural or modified), alginates, carrageenanes, pectins, xanthanes or cellulose derivatives such as carboxymethyl cellulose, methyl cellulose or hydroxymethyl cellulose. These compounds can be classified as "gums" [see definition given in Kirk-Othmer, Encyclopedia of Chemical Technology, 2nd Edition, Vol. 10, p. 741]. The term therefore includes natural gums such as extracts of algae and gum arabic, and modified or semi-synthetic gums. Cellulose and starch derivatives are included together with gum produced by microbial fermentation, e.g. heteropolysaccharides, the biopolymers known under the name of emulsans [see European patent application No. 178443 published on 23.4.86]. These water-soluble vehicles can be used separately or mixed. Preferably use is made of gum arabic, shellac, maltodextrins, starch or partially hydrolysed proteins.

The substances used as emulsifying agents can be fatty-acid mono- or diglycerides, fatty-acid esters with sorbitol or saccharides or esters of tartaric or citric or ascorbic or lactic acids or alginates and pectins.

The aromatic emulsion is applied by spraying, e.g. using a compressed-air sprayer. Of course the pressure can be varied in dependence on the viscosity of the emulsion, the desired flow rate and the product to be flavoured. A pressure between 2 and 10 bars, preferably 3 to 5 bars, seems perfectly adapted to the various cases examined.

In a preferred embodiment, a Venturi-type sprayer is used with compressed air at 4 bars, an air nozzle 4 to 8 mm in diameter, a 0.6–0.9 mm liquid suction nozzle and an emulsion flow rate of 10 to 40 g/min.

The emulsion can be applied to the treated product by disposing the product on a flat surface, e.g. by spreading it on a moving belt or in a rotary drum, thus obtaining very uniform coating.

As previously stated, the water supplied by spraying the emulsion on to the product is absorbed or quickly evaporated at ambient temperature, so that drying is unnecessary. If however the emulsion may add undesirable quantities of water to the product, it may be necessary after treatment to dry the product in an oven at about 40° C. for 10 to 20 minutes.

The proportions by weight of the ingredients of the emulsion may vary within a very wide range. The preferred proportions (by weight) are as follows:
 a. from 0.5 to 20% active volatile flavouring substance,
 b. from 5 to 30% water-soluble film-building vehicle,
 c. from 0.1 to 10% emulsifying agent and
 d. remainder water.

Application of the emulsion according to the invention has certain advantages over the known methods of flavouring food, more particularly tea.

The method is "direct", not using the indirect encapsulation flavouring techniques known in the art. The method is therefore more economic. Compared with conventional methods in the tea industry such as sprinkling the flavouring in the form of a sugar syrup, the method according to the invention is more efficient and more reliable. The volatile flavouring constituents are not dispersed into the ambient atmosphere to the same extent during the spraying operation, thus reducing losses and obtaining more uniform flavouring, since the proportions of the flavour constituents remain practically constant during the entire operation. Finally the thus-flavoured tea preserves its acquired organoleptic properties for a long time without loss, since the flavouring is protected from external influences and agents (such as evaporation or oxidation) capable of modifying its character.

The emulsion can be sprayed during any stage of treatment of tea, either on to the leaves or cuttings but preferably before packaging. The method is also suitable for perfuming of porous materials for packaging edible compositions or spices in the form or leaves, powder or particles, the method being to spray or immerse the materials with an aromatic emulsion as described hereinbefore. The method is perfectly suitable for perfuming the paper for packaging tea in the form of powder or leaves or particles for preparing infusions or decoctions. The method is also suitable for perfuming paper for use as a filter, e.g. for preparing coffee-based drinks.

Although the method is particularly applicable to the flavouring of tea, it is also of use for other edible compositions in the form of e.g. leaves, powders or particles, or spices.

The active flavouring substance can be one of the flavouring compositions conventionally used for giving, improving or modifying the taste and aroma of food, more particularly tea. If necessary, of course, individual specific flavouring substances can be used, e.g. the natural flavouring substances mentioned hereinbefore in the opening part. Volatile substances of use for this purpose include those described in specialised works such as S. Arctander, Perfume and Flavor Chemicals, Montclair, N.J. (1969), and Fenaroli's Handbook of Flavor Ingredients, 2nd Edition, Ohio (1975). The concentrations of flavourings in the emulsion depend on the nature of the treated product and on the particular desired flavouring effect. Concentrations of the order of 0.5 to 20% (parts by weight) with respect to the weight of the flavoured edible composition or spice can generally be used in most practical cases examined.

The invention will be illustrated in more detailed but non-limitative manner by the following examples.

EXAMPLE 1

77 g of a fruit-type flavouring composition (Orange 55.597 T; origin: Firmenich SA, Geneva) were emulsified with a solution obtained by mixing the following ingredients (parts by weight):

| | |
|---|---|
| Malto-dextrin[1] | 225 |
| (Maltrin-Glucidex, registered trademarks) | |
| Manucol LF[2] | 5 |
| Demineralised water | 770 |
| Total | 1000 |

[1] A 10:90 mixture of malto-dextrins (origin: Roquette Freres, Beinheim, France and Grain Processing Corporation, Muscatine, Iowa, USA)
[2] Sodium alginate (origin: Alginate Industries Ltd., Great Britain) The viscosity of the mixture was 72 cps.

130 g of the resulting flavouring emulsion were dispersed by spraying, using a Venturi sprayer, on to 1000 g of tea leaves (Ceylon type, origin: Migros, Geneva). The flavoured tea leaves were then packed in paper bags containing 1.6 g of tea per bag. The bags were stored and kept away from light at ambient temperature of 7 months. Drinks obtained by infusing the resulting bags had a more distinctive taste and aroma than drinks prepared from tea packed in bags freshly flavoured with an aromatic syrup. The syrup was prepared as follows.

0.5 g of Orange 55.597 T flavouring used to prepare the emulsion defined hereinbefore were mixed with 6 g of a 65% (65° Brix) solution of sugar in demineralised water. The resulting mixture was sprayed in the manner previously described on to 50 g of Ceylon-type tea leaves (origin: Migros, Geneva).

Other tea samples were similarly flavoured with the following aromas:

| | | |
|---|---|---|
| Lemon | 502.142 | T |
| Raspberry | 54.428 | A |
| Strawberry | 502.301 | T |
| Cinnamon | 50.651 | T |
| Apple | 52.681 | T |

All these compositions originate from Firmenich SA, Geneva.

In all the cases tested, drinks made from tea flavoured with the emulsion prepared by the method according to the invention had a more distinctive aroma than drinks prepared from tea flavoured with syrup, in spite of prolonged storage of 6 months or more.

EXAMPLE 2

7 g of fruit-type flavouring composition (Orange 55.597 T; origin: Firmenich SA, Geneva) were emulsified with a solution obtained by mixing the following ingredients (parts by weight):

| | |
|---|---:|
| Hydrocollan PP4[(1)] | 5.0 |
| Maltodextrin | 20.0 |
| Manucol F[(2)] | 0.5 |
| Demineralised water | 74.8 |
| Total | 100.0 |

[(1)]Hydrolysed collagen (origin: Friedrich Naumann, Memmingen, FRG)
[(2)]See Example 1

10 g of the resulting emulsion were dispersed by spraying on to 90 g of Ceylon-type tea leaves (origin: Migros, Geneva) by the method described in Example 1. The flavoured tea leaves were then packed in paper bags containing 1.6 g tea per bag and the bags were stored away from light at ambient temperature for 7 months.

Drinks made by infusing the resulting bags had a distinct flavour and aroma, more marked than in drinks prepared from tea packed in identical bags freshly flavoured with sugar syrup (see Example 1).

EXAMPLE 3

The flavouring emulsion prepared as per Example 2 was directly dispersed on to paper bags containing 1.6 g of Ceylon-type tea (origin: Migros, Geneva). Each bag was flavoured with about 0.18 g of emulsion, corresponding to a flavouring content of 0.787% (based on the content of tea).

After packaging in cardboard containers and storage for 6 months at ambient temperature, the flavouring bags were used to prepare drinks by infusion in conventional manner. Organoleptic evaluation by a panel of experts showed that the drinks had a distinctive taste and aroma typical of the orange aroma used.

EXAMPLE 4

The method was the same as in Example 2 but using "peppermint" type flavouring composition (Peppermint Naefco; origin: Firmenich SA, Geneva). The resulting emulsion was used to flavour paper bags containing 1.6 g mint leaves (origin: Migros, Geneva). After storage under the conditions defined in Example 3, the bags were used to prepare drinks by simple infusion. The resulting drinks had a pleasant, pronounced mint flavour, much more characteristic than the flavour of drinks obtained from non-flavoured bags.

Similar or even superior effects were observed on using bags flavoured by immersion in the emulsion followed by drying in air.

What we claim is:

1. A process for flavouring a composition chosen from among products for infusion or decoction selected from the group consisting of tea, camomile, verbena and mint in the form of leaves, powders or particles, said process comprising the steps of:
    directly spraying said composition with an emulsion comprising:
        5 to 30% of a solid film-building vehicle selected from the group consisting of polyvinyl acetate, polyvinyl alcohol, dextrins, natural or modified starch, natural or modified proteins, vegetable gums, pectins, xanthanes, carboxymethyl cellulose, methyl cellulose, hydroxyethyl cellulose and lipoheterosaccharides;
        0.1 to 20% of an emulsifying agent selected from the group consisting of fatty-acid mono- or diglycerides, esters derived from a combination of fatty acids with sorbitol or a saccharide or alkoxylated derivatives thereof, or an ester of tartaric, citric, ascorbic or lactic acid; and
        0.5 to 20% of an active volatile flavouring substance which is non-miscible with water with the remainder of the emulsion being water; and
    subsequently drying the emulsion-sprayed composition such that the flavouring substance is in direct contact with the leaves, powders or particles of the composition and is retained in the form of droplets coated with a protective water soluble layer consisting of said film-building vehicle.

2. The process of claim 1, wherein the emulsion-sprayed composition is dried by simple gradual exposure to air.

3. The process of claim 1, wherein the emulsion-sprayed composition is dried by exposure to a source of heat.

4. The process of claim 1, wherein the drying of the emulsion-sprayed composition is assisted by applying slight suction or aeration.

* * * * *